US012240014B2

(12) United States Patent
Bowie

(10) Patent No.: US 12,240,014 B2
(45) Date of Patent: Mar. 4, 2025

(54) TINE ASSEMBLY

(71) Applicant: ECOFILL GROUP LIMITED, Leeds (GB)

(72) Inventor: David Bowie, Suffolk (GB)

(73) Assignee: ECOFILL GROUP LIMITED, Leeds (GB)

( * ) Notice: Subject to any disclaimer, the term of this patent is extended or adjusted under 35 U.S.C. 154(b) by 0 days.

(21) Appl. No.: 18/579,339

(22) PCT Filed: Jul. 18, 2022

(86) PCT No.: PCT/GB2022/051844
§ 371 (c)(1),
(2) Date: Jan. 13, 2024

(87) PCT Pub. No.: WO2023/285838
PCT Pub. Date: Jan. 19, 2023

(65) Prior Publication Data

US 2024/0326094 A1 Oct. 3, 2024

(30) Foreign Application Priority Data

Jul. 16, 2021 (GB) .................................... 2110273
Oct. 20, 2021 (GB) .................................... 2115019
Jun. 15, 2022 (GB) .................................... 2208808

(51) Int. Cl.
*B07B 1/12* (2006.01)
*B02C 23/08* (2006.01)

(52) U.S. Cl.
CPC ................ *B07B 1/12* (2013.01); *B02C 23/08* (2013.01)

(58) Field of Classification Search
CPC .... B07B 1/12; B07B 1/28; B07B 1/46; B07B 1/4609; B07B 2201/04; B02C 23/08
See application file for complete search history.

(56) References Cited

U.S. PATENT DOCUMENTS 3,971,716 A 7/1976 Foreman
2019/0112785 A1* 4/2019 McCabe ................. B07B 1/005
2019/0366243 A1* 12/2019 Colgrove .............. B07B 1/4609

FOREIGN PATENT DOCUMENTS

GB 2134415 A 8/1984
JP 2009-142765 A 7/2009
WO 2022136880 A1 6/2022

OTHER PUBLICATIONS

"International Search Report" in PCT/GB2022/051844 dated Nov. 18, 2022.
"Written Opinion of the International Searching Authority" in PCT/GB2022/051844 dated Nov. 18, 2022.

* cited by examiner

*Primary Examiner* — Michael McCullough
*Assistant Examiner* — Jessica L Burkman
(74) *Attorney, Agent, or Firm* — William H. Bollman

(57) ABSTRACT

A comminution apparatus comprising a hopper to collect and guide material to be comminuted onto an array of tines, the tines having an elongate body having a first end and a second end and upper and lower surfaces, a tine being secured to a tine support at a first end, a motor secured to the apparatus, preferably the hopper, the operation of the motor causing the tines to vibrate.

24 Claims, 16 Drawing Sheets

SECTION A-A

SECTION K-K

DETAIL H
SCALE 1 : 1

DETAIL G
SCALE 1 : 1

TINE ASSEMBLY

FIELD OF THE INVENTION

The present invention relates to an apparatus to comminute material such as rubble and earthworks, and also, incorporated therein, an improved tine assembly for breaking an initial particulate material into smaller particles. Multiple tines are particularly suitable for use as a screen sieve for breaking wet particulate material in extractive screening and/or crushing plant machinery.

BACKGROUND TO THE INVENTION

The majority of the built environment, such as roads, footpaths and buildings etc. is formed from raw materials sourced from the earth by extractive plant machinery. The extracted particulate material, such as rock, sand and gravel, requires crushing and screening into various size categories in order to produce a useable aggregate/particulate material.

The extractive plant machinery typically comprises a full range of crushers, screens, and conveyors, either mobile or static, which are designed to take raw particulate materials and reduce them to usable aggregates having reduced particle sizes.

There are several drawbacks with prior art extractive plant machinery, which typically employ an initial sifting screen and/or crushing means. First, when the material is wet, the holes within the screen can easily become blocked with wet material.

A configuration of known tines is arranged within a frame, which in use, is located across the material inlet of the plant machinery. Typically, each neighbouring tine has a smooth outer surface upon which wet material builds up and eventually bridges the gap between the neighbouring tines, Eventually the material will build up until it slides off the bridged tines, without being broken down to an intended size.

The amount of material passing through the screen therefore drops and smaller particles can remain on the screen rather than pass through. A further problem is that quite small particles can remain adhered to the surface of larger particle through, for example, surface tension by water present. Again, therefore, the sieving process is thereby rendered inefficient. Second, again when the material is wet, large clumps of material slide over a conventional screen and so, even when of the correct size, do not pass through the screen.

It is an object of the current invention to provide an improved tine assembly which can be incorporated into the above extractive plant machinery which addresses the above problems, and which prevents large clumps of particulate material from blocking the flow of material through the plant machinery or of simply passing across not through a screen.

SUMMARY OF THE INVENTION

According to a first broad independent aspect of the invention, there is provided a comminution apparatus comprising a hopper to collect and guide material to be comminuted onto an array of tines, the tines having an elongate body having a first end and a second end and upper and lower surfaces, a tine being secured to a tine support at a first end, a motor secured to the apparatus, preferably the hopper, the operation of the motor causing the tines to vibrate.

The tines act to break down material, or agglomerations into smaller particles which are collected and can be reused in construction work.

Preferably, the apparatus comprises a set of two or more arrays of tines, deployed such that the second end of tines in an array of tines are adjacent the first ends of a neighbouring array of tines. Further preferably, the second end of an array is deployed higher than the first end of an adjacent array so that material can pass under gravity from one array to a neighbouring array.

Preferably, a tine has one or more teeth deployed on the upper surface of the tine. Further preferably, the teeth are parallel to the elongate tine body.

Preferably, a tooth is offset to teeth on a neighbouring tine in a direction along the elongate tine body.

Optionally, the upper surface of a tine is wider than the lower surface to reduce the chance of material becoming jammed between neighbouring tines.

Preferably, tines in an array are deployed parallel to neighbouring tines in the array.

Optionally, a tine includes one or more caps along the upper surface which act to widen a tine and the or each cap being replaceable when worn.

Preferably, the apparatus comprises an upper and lower set of arrays, the lower set being deployed beneath the upper set and receiving material falling between the tines of the upper array. Further preferably, the distance between adjacent tines in the set of arrays in the lower array is less than the distance between the tines in the upper set of arrays.

Preferably, a tine is arranged so that the tine is in an inclined position relative to a horizontal plane.

Preferably, multiple tines are arranged on the tine support, wherein two or more tine devices each comprises a different configuration of teeth.

Optionally tines do not have teeth. These profile types can have high points to provide a lift originating from the screen vibration action. The end of tine profile can rise (e.g. in a substantially "ski-jump" configuration) to kick lumps of particulate material up.

Preferably, multiple tines are arranged on the tine support, wherein the space between two or more tines is variable.

Preferably, a tine comprises a receiving body portion including an attachment means for attaching the elongate body to the tine support, the attachment means further comprising a first surface with a recess which cooperates with a protuberance located on the surface of the tine support.

Preferably, the attachment means further comprises a second surface with a second recess which cooperates with a second protuberance located on the surface of the tine support.

Preferably, the attachment means further comprises a first plate which abuts a first side of the elongate body, and a second plate that abuts a second side of the elongate body; the first plate comprises a first aperture, the second plate comprises a second aperture, the elongate body comprises a third aperture; whereby a pin being located within the cooperating first, second and third apertures, which in use attaches the elongate body to the attachment means.

The attachment means further optionally comprises a third plate which abuts a second side of the elongate body, whereby the third plate abuts the first plate, wherein the first surface cooperates with the second surface to provide a first aperture which cooperates with the tine support.

Preferably, the attachment means further comprises a fourth plate which abuts a second side of the elongate body, whereby the fourth plate abuts the second plate, wherein a third surface cooperates with a fourth surface to provide a second aperture which cooperates with the tine support.

Preferably, a tine further comprises a rear supporting bracket and an attached first elongate bar, whereby the first bar is located on a top surface of the elongate body, between the first, second, third and fourth plates.

Preferably, the rear bracket comprises second elongate bar, whereby the second bar is located on a bottom surface of the elongate body, between the first, second, third and fourth plates.

Preferably, the first bar is welded to the tine support, and to the first and third plates and the second bar member is welded to the supporting member, first and third plate members.

Preferably, a tine is secured at the second end to a tine support to increase the stability.

BRIEF DESCRIPTION OF THE FIGURES

The invention is now described with reference to the accompanying drawings which illustrate embodiments of a comminution apparatus and tines incorporated therein. In the drawings.

DETAILED DESCRIPTION OF THE FIGURES

Figure 1:
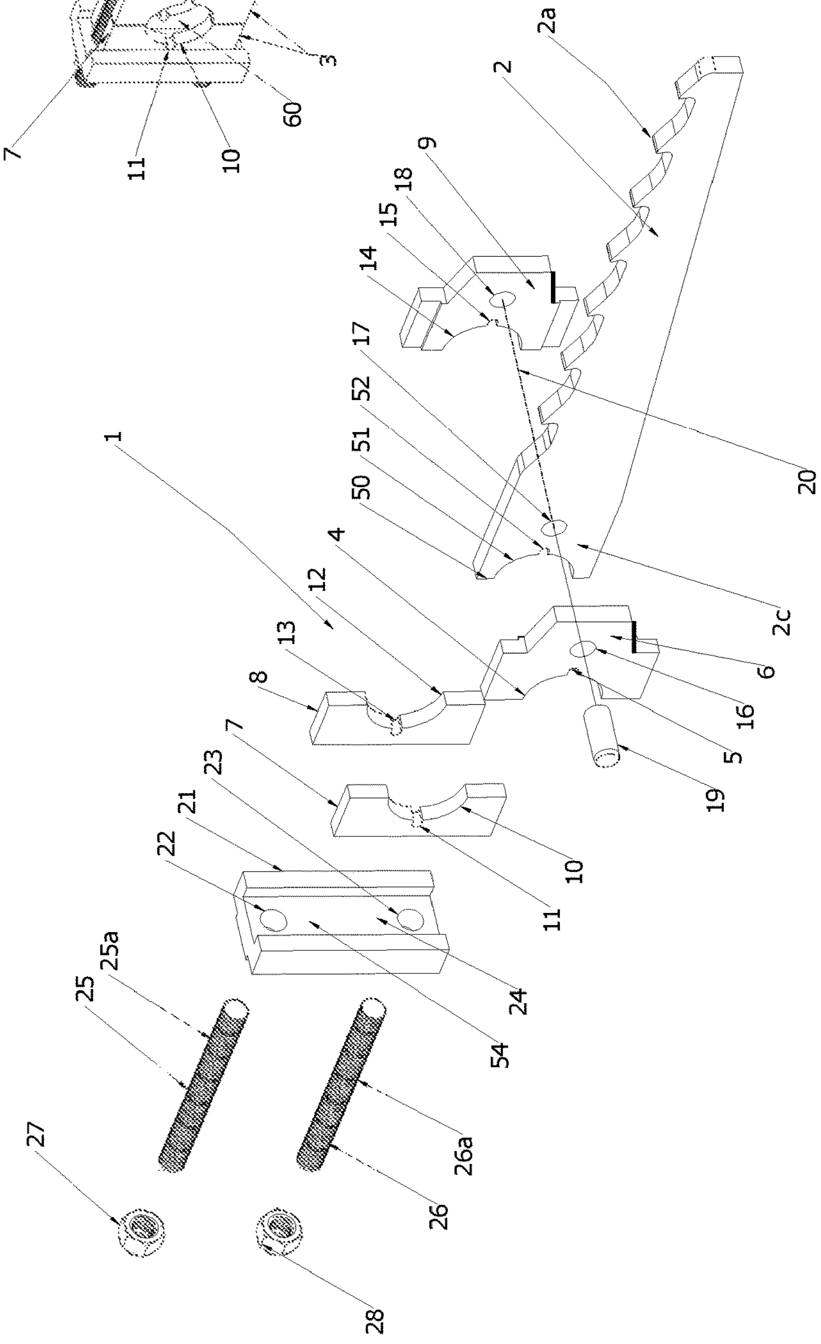
FIG. 1 provides a view of a tine device, prior to assembly.

FIG. 1 shows an exploded view of a first embodiment of a tine, generally indicated by arrow 1. The tine 1 has an elongate body portion 2 which has a linear tooth array upon its top surface. The elongate body portion 2 has an aperture located at one end of the body 2C upon which the tooth array does not extend. The tine end 50 has an arcuate side surface 51 with a central recess 52.

A first attachment plate 6 is has an aperture 16, an arcuate side surface 4 with a central recess 5. A second attachment plate 9 has an aperture 18, and an arcuate side surface 14 which has a central recess 15.

In use, the first attachment plate 6 is located onto a first side of the elongate body portion 2 so that the aperture 16 is aligned with the aperture 17 of the elongate body portion 2. The second attachment plate 9 is located on the opposite second side of the elongate body portion 2 so that the aperture 18 is aligned with the aperture 17 of the elongate body portion 2. A metal pin 19 is inserted through the aligned apertures 16, 17, 18, as indicated by arrow 20, and is permanently fixed into position via a welding or other fixing methods. The inserted pin 19 permanently attaches the first and second attachment 6, 9 plates to the elongate body portion 2. The recesses 5, 15 of the attached first and second attachment plates 6, 9 are aligned with the recess 52 of the elongate body portion 2 and thereby provide an overall combined recess which extends through the first and second attachment plates 6, 9 and elongate body portion 2 of the tine 1.

A third attachment plate 7 has an arcuate side surface 10 with a central recess 11. A fourth attachment plate 8 has an arcuate side surface 12 which has a central recess 13.

A supporting member 24 comprises a vertical channel 54 which has two fixing apertures 22 and 23.

In use, two elongate attachment bars 25 and 26 are inserted through the two apertures 22, 23 within the supporting member 24. Each attachment bar 25 and 26 is threaded along its length which threads in use, cooperates with corresponding fixing nuts 27, 28. The purpose of the elongate bars 25, 26 is to provide upper and lower mechanical support to the elongate body portion 2.

Figure 2:
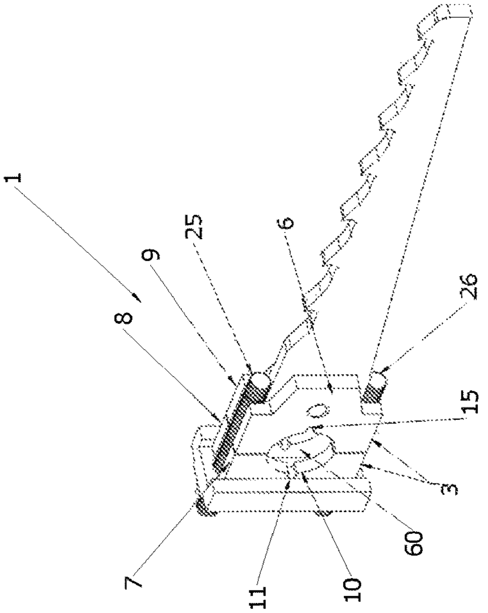
FIG. 2 provides a perspective view of the tine device.

FIG. 2 shows an assembled tine 1. The first attachment plate 6, second attachment 9 plate, third attachment plate 7 and fourth attachment plate 8 are assembled together to provide an overall attachment means 3 for attaching the elongate body portion 2 to an elongate supporting member (not shown). The assembled arcuate side surfaces 10 and 4 of the first and third attachment plates 6 and 7 co-operate to form an aperture 60 with the recesses 5 and 11 deployed diametrically opposite each other.

The attachment bars 25 and 26 are located in the upper and lower channels which are formed between the assembled attachment plates 6,7,8 and 9. The attachments bars 25, 26 are then permanently attached within the channels via welding them to the first and second attachments plates 6 and 9.

The welded attachment bars 25, 26 are then retained to the rear support bracket 24 via attaching and subsequent tightening the fixing nuts 27 and 28.

Figure 3:
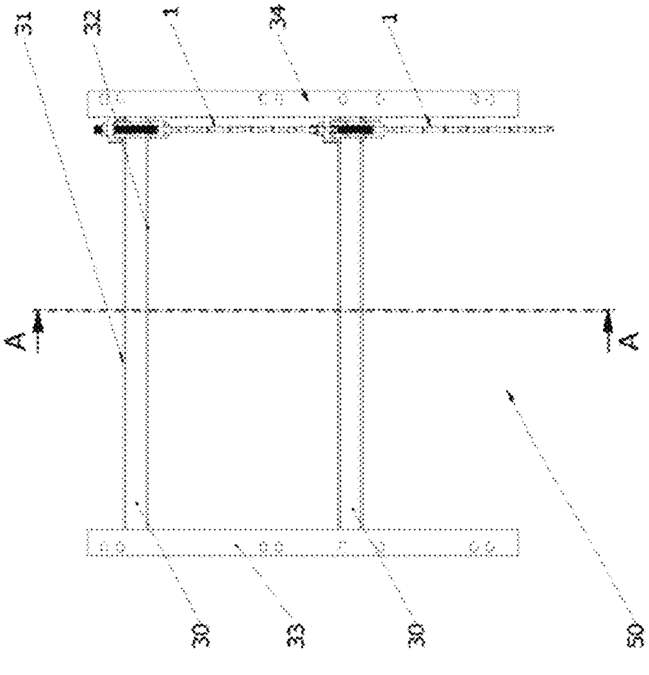
FIG. 3 provides a plan view of two tine devices attached to a frame assembly.

FIG. 3 shows a plan view of a mounting frame for plant machinery, generally indicated by the arrow 50, comprising two elongate side members 33 and 34, which are connected together via two elongate tine supporting members 30. The tine supporting members 30 are deployed perpendicularly to the inner surfaces of both side members 33 and 34.

A tine device 1 is attached in close proximity to the right end portion of each tine supporting member 30. Each tine device 1 is attached so that the recesses (FIGS. 1. 11, 5, 15 and 13) of each tine device 1 cooperate with elongate protuberances 31 and 32 that extend along the outer surface of each tine supporting member 30. The protuberances 31 and 32 are also diametrically opposite to each other on the outer surface of a supporting member 30.

Figure 4:
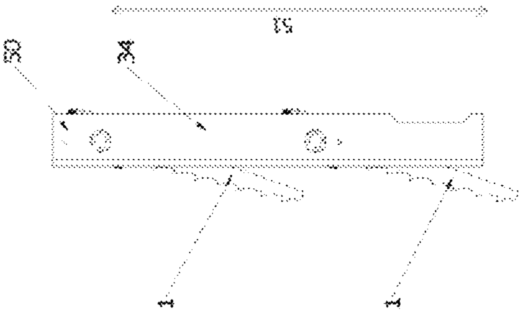
FIG. 4 provides an end view of two tine devices attached to a frame assembly.

FIG. 4 shows an end view of the mounting frame 50 in which the two attached tine devices 1 are mounted in an inclined configuration that is in the region of 0 to 45 degrees relative to the bottom horizontal plane 51. The preferred angle of the inclined tines being 13 degrees relative to the bottom horizontal plane indicated by arrow 51. Each inclined tine device has a tooth array upon its upper surface.

Figure 5:
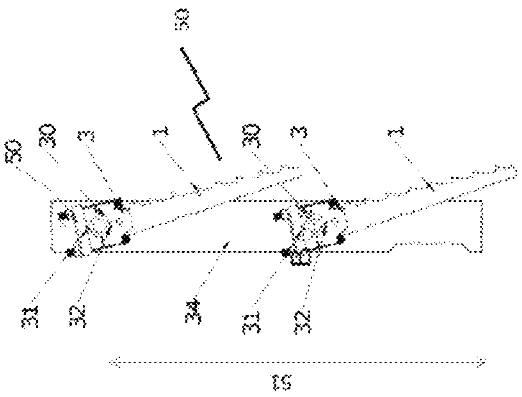
FIG. 5 provides an inner view of two tine devices attached to a frame assembly.

FIG. 5 shows an inner end view of the mounting frame 50 shown in FIG. 4.

Figure 6:
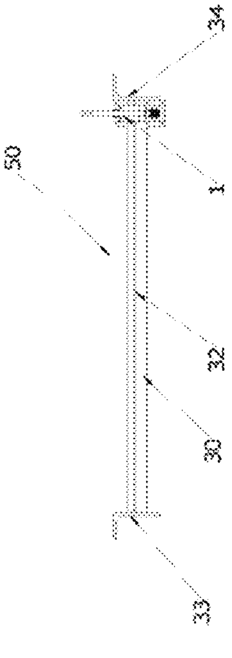
FIG. 6 provides a front view of a tine device attached to a frame assembly.

FIG. 6 shows a front view of the mounting frame 50, which shows two elongate side members 33 and 34, connected together via tine supporting member 30. The tine protuberance 32 extends linearly along the outer surface of supporting member 30.

Figure 7:
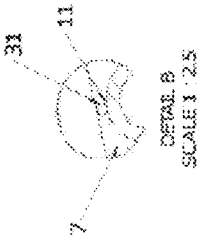
FIG. 7 provides an enlarged view of a tine device attached to a frame assembly.

FIG. 7 shows an enlarged view of the tine device 1 which attached to the tine supporting member 30. The recess 11 within the tine device 1 cooperates with the protuberance 31 which extends along the tine supporting member 30.

In use, the recess of the tine device and the protuberance on the tine supporting member, cooperate to prevent any rotation movement of the tine device, relative to the tine supporting member, when impacted by large amounts of heavy particulate material such as mud, rocks and clay etc.

Figure 8:
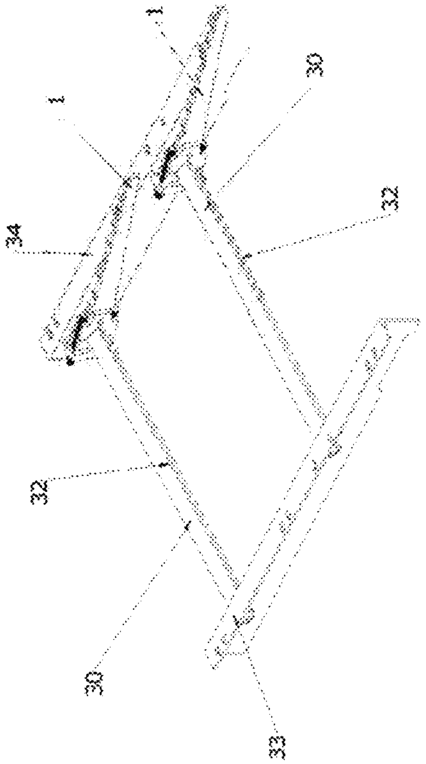
FIG. 8 provides a perspective view of two tine devices attached to a frame assembly.

FIG. 8 shows a perspective view of the tine devices 1 attached to a mounting frame as shown in FIGS. 3 to 6.

Figure 9:
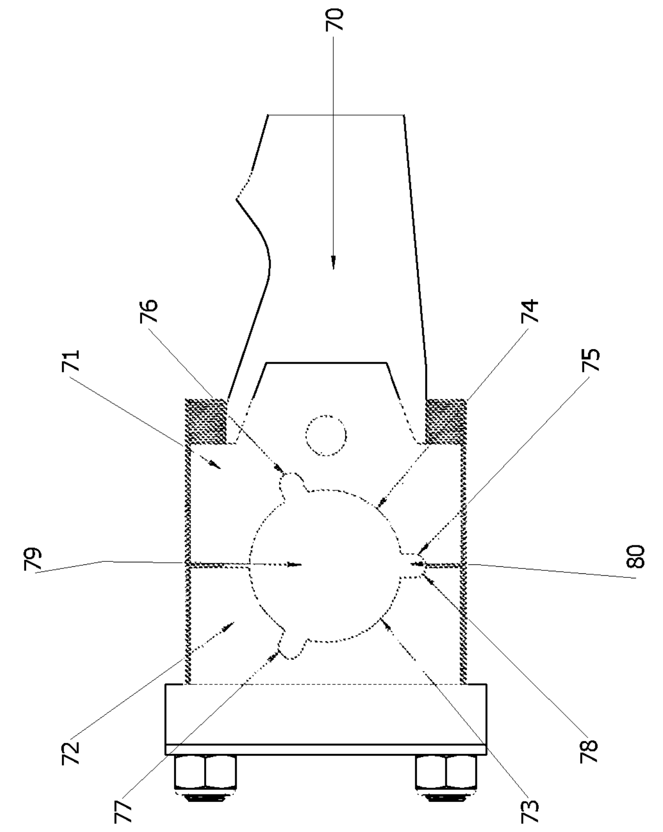
FIG. 9 provides an enlarged side view of the tine device.

FIG. 9 shows an enlarged side view of a tine device generally indicated by arrow 70, comprising a first attachment plate 71 and a second attachment plate 72.

The first attachment plate 71 has an arcuate side surface 74 which has a recess 76 and a half-recess 75. The second attachment plate 72 has an arcuate side surface 73 which has a recess 77 and a half-recess 78.

The assembled first and second attachment plates 71, 72 co-operate to form an aperture 79. The aperture has three recesses within its inner side surface, with each recess radially spaced from a neighbouring recess by 120 degrees. The bottommost recess 80 within the aperture 79 is formed by the abutment of the half-recesses 75 and 78.

The three recesses 76, 77, 80 co-operate with three protuberance members which are located on an elongate tine supporting member (not shown). In use, each recess 76, 77, 80 absorbs a radial force which is generated by falling particulate material impacting upon a serrated tine device. The plates 71, 72 are held together by threaded bolt are held together by means of a threaded bolt 81.

In a further embodiment, the upper in-use surface of a tine is provided with teeth to improve the cutting process in reducing the particle size of a material. Tines therefore can have multiple teeth and having teeth profiles that are arrayed in a staggered pattern across the working section of the of the frame. For example, in one embodiment, a tooth of a tine is so deployed that the tooth lies midway, in a direction along the length of the tine on which it is located, between teeth on neighbouring tines.

Figure 10B:
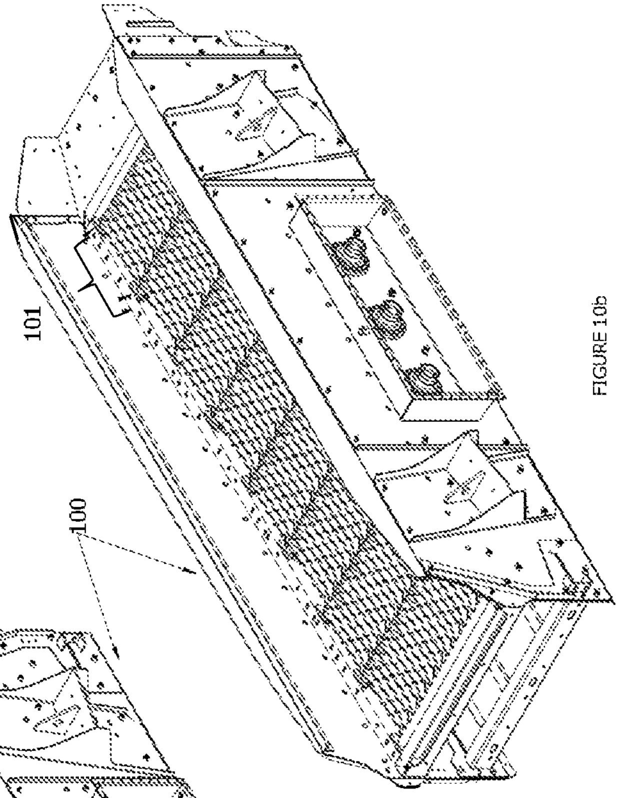
FIGS. 10*a*, 10*b* are perspective views of a tine array, incorporating tines including a further embodiment of support.
Figure 10A:
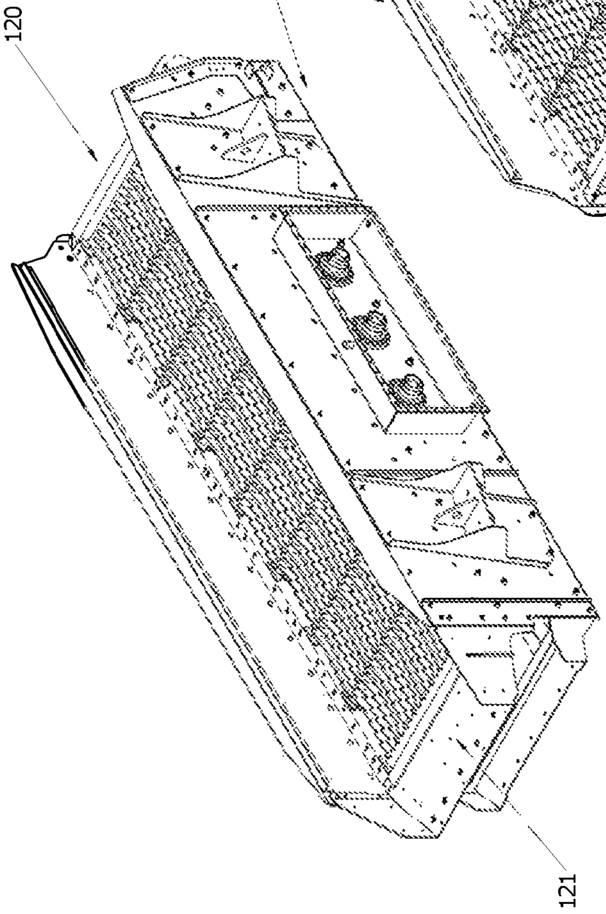
Figure 11:
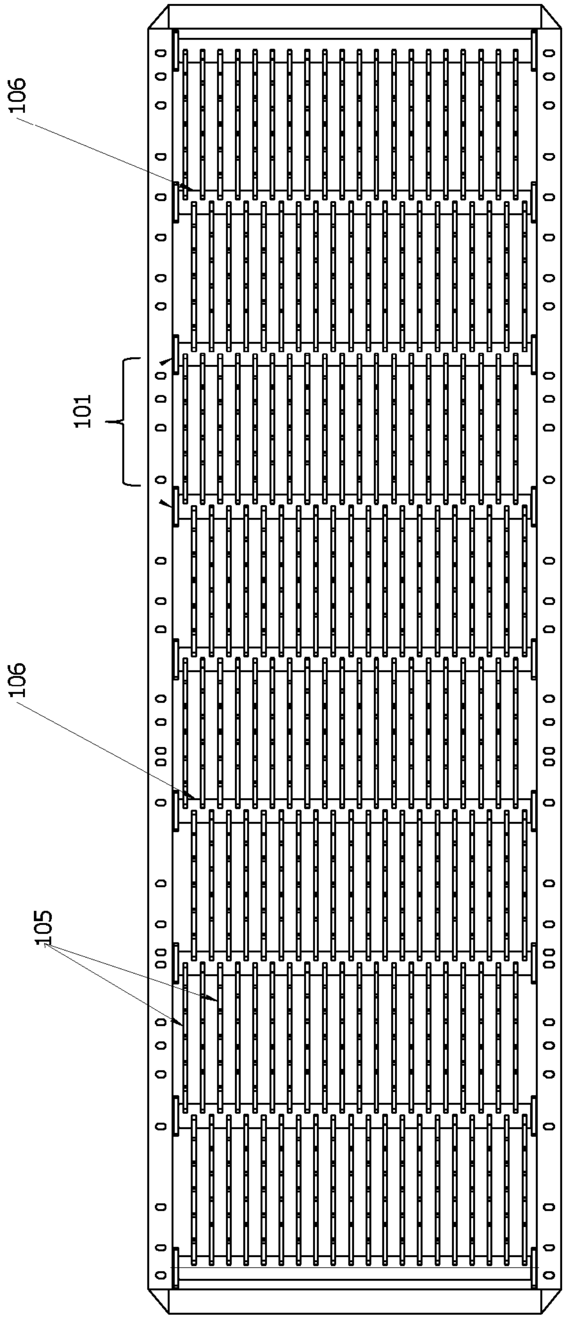
FIG. 11 is a top view of the array of FIGS. 10*a*, 10*b;*
Figure 12:
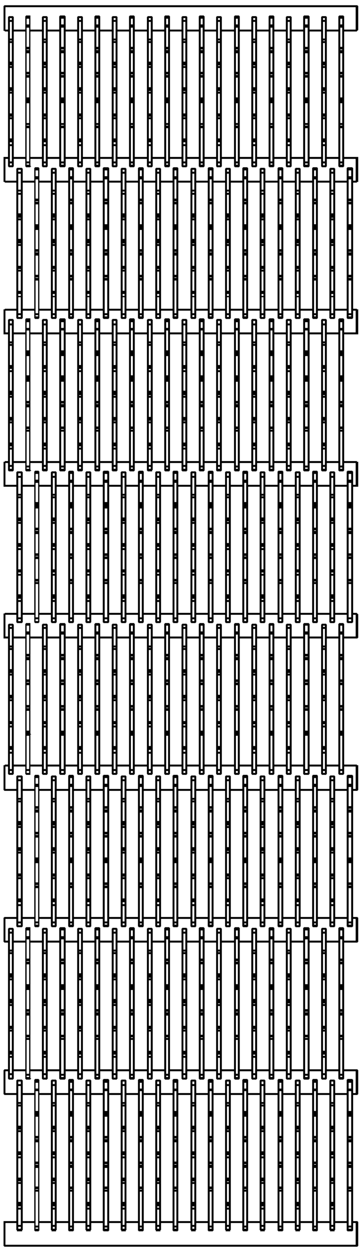
FIG. 12 illustrates the array of FIG. 11 with the side frame removed.

FIGS. 10 and 11 illustrate a separating apparatus, generally referenced 100, comprising tines deployed in a set of arrays 101 of parallel tines. It should be noted that herein, a set of arrays can refer to one or more arrays co-operating together. Each array, as can be seen from FIG. 11 comprises a plurality of tines 105 which are fixed at both ends to a cross-piece 106, typically of generally circular cross-section. This allows the structural size of the cross-members to be reduced in size compared to an apparatus where only one end of a tine is secured. The tines of an array 101 are offset laterally from the tines of a neighbouring array to improve the efficiency with which material can pass through the tines 105. As can be seen from FIG. 13, each neighbouring array 101 is offset vertically downwards to the neighbouring previous array as material moves from a first end 120 to a second end 121 of the apparatus 100 which facilitates movement of material. In an alternative embodiment, not illustrated, tines can be mounted such that tines are not parallel to a neighbouring tine, which can provide an improved cutting action for certain materials. For this arrangement it is convenient to clamp a tine to a cross-tube of the frame, which aids the provision of a gap between tines and in particular, the provision of non-parallel tines.

Figure 13:
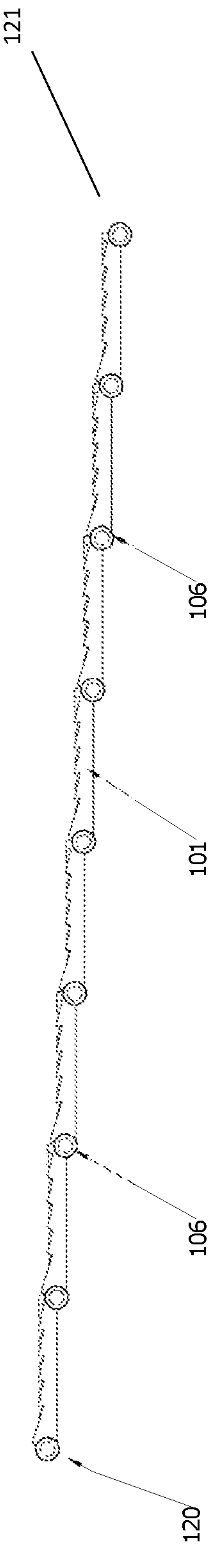
FIG. 13 illustrates the stepped arrangement of tine assemblies in the array of FIG. 11.
Figure 14C:
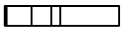
FIGS. 14*a*-14*d* illustrate a yet further embodiment of a tine.
Figure 14D:
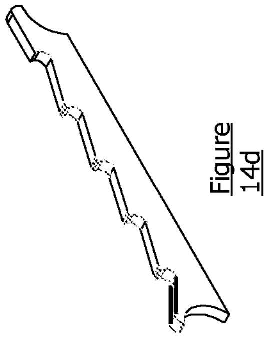
Figure 14A:
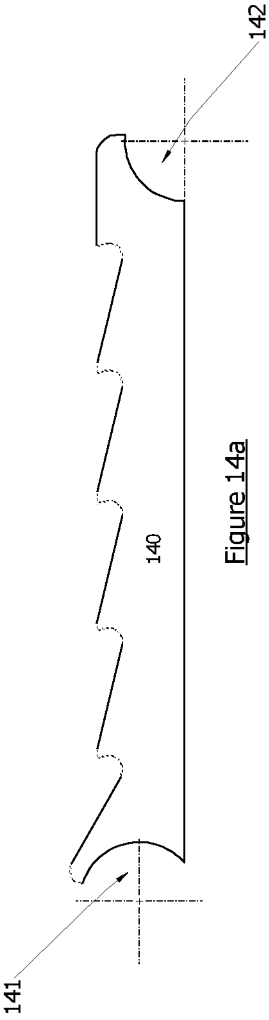
Figure 14B:
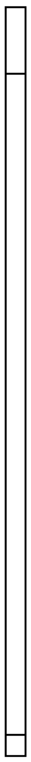
Figure 15D:
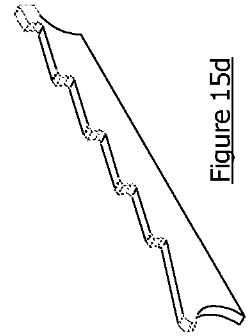
FIGS. 15*a*-15*d* illustrate a still yet further embodiment of a tine.
Figure 15C:
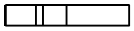
Figure 15A:
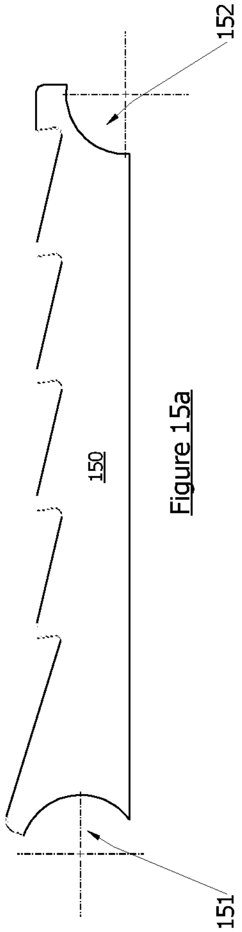
Figure 15B:

To facilitate fixture of a tine to a cross-piece 106 then in a second embodiment of fixture means, each end of the tine has a convex cut-out. For example, in FIG. 14*a*, a first end of the tine 140 has a cut-out 141, with a second cut-out 142 at the second end of the tine 140. The cut-outs 141, 142 are each orientated away from the tine 140, with the cut-out 141 facing in an upward direction, and the cut-out 142 facing in a downwards direction. When the tine 140 is secured in position therefore about a cross-piece, the cross-piece about which the cut-out 141 is secured will be higher in the apparatus 100 than the cross-piece about which the cut-out 142 is secured. Neighbouring arrays of tines are therefore at a different level to the neighbouring array, producing a stepped configuration as illustrated in FIGS. 10 and 13.

In the tines 150 shown in FIGS. 15*a*-15*d*, the cut-outs 151, 152 do not extend as far round a cross-piece as those in FIGS. 14*a*-14*d* to facilitate the removal and replacement of a tine during manufacture or repair.

In use, material to be broken down and separated into particles of different sizes is added to the first end 120 of the apparatus 100 via a hopper. The material then passes down the slope formed by the arrays 101 of tines 105 towards the second end 121 of an array 101. The tines 105 are caused to vibrate by a motor secured, for example, to the hopper. As the material passes along the bank of tines 105, the movement of the tines 105 acts to break down the material. The material is impacted by the tines, and in particular the engagement with the teeth of the tines causes the tines to be reduced in size, with particles of sufficiently small size passing between neighbouring tines 105 to be collected in a trough (not shown).

Figure 16:
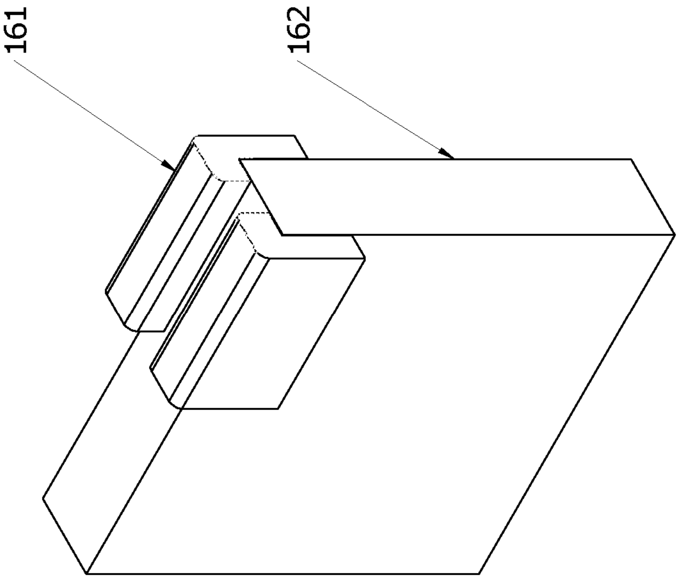
FIGS. 16 and 17 illustrate a perspective and an end view of a tine having surface caps.
Figure 17:
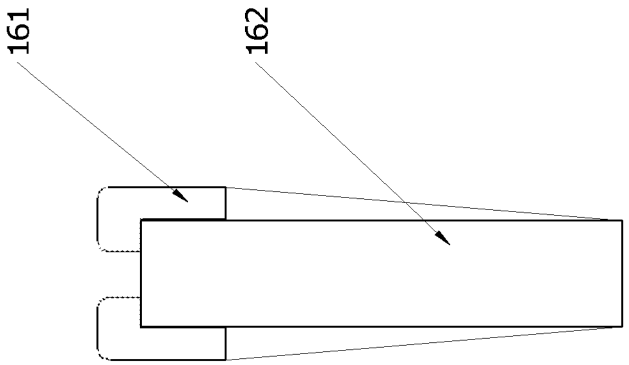
Figure 18A:
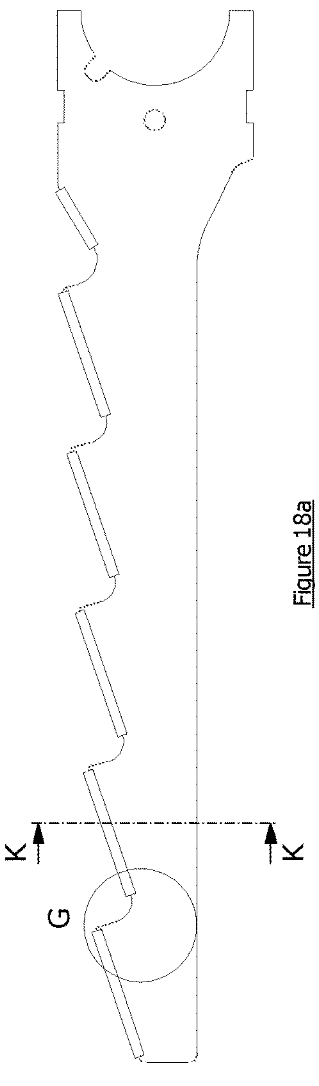
FIGS. 18*a*-18*g* illustrate a tine having decreasing thickness on going from the top to the bottom surfaces of the tine.
Figure 18D:
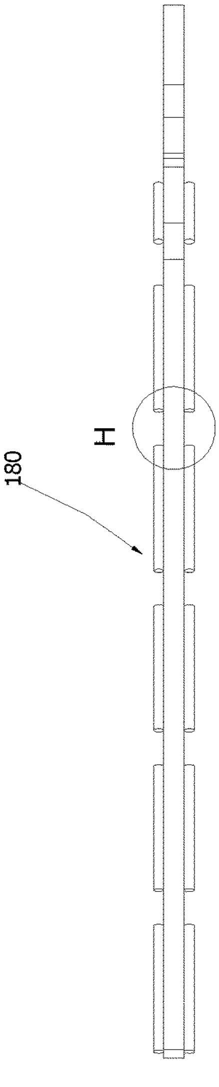
Figure 18C:
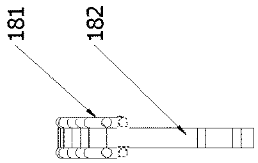
Figure 18B:
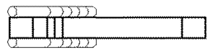
Figure 18F:
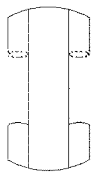
Figure 18E:
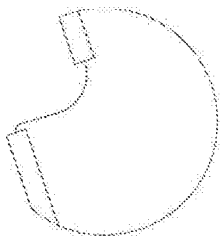
Figure 18G:
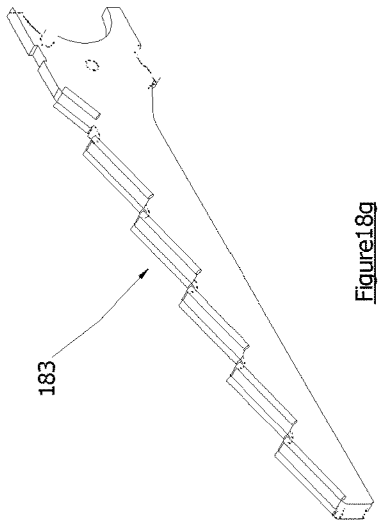

FIGS. 16 and 17 illustrate a further optionally advantageous feature of a tine 160. The tine 160 has been provided on its in-use upper surface with a cap of a sacrificial material. The cap 161 is applied for example by TIG welding and prolongs the working life of a tine. The cap forms a taper when viewed along the length of the tine to minimise any restriction on material passing between neighbouring tines. In a further embodiment of tine, as illustrated in FIGS. 18, the teeth of a tine 180 are wider along the tops 181 of the teeth 183 of the tine than along the bottom 182 of the tine 180. This provides that the gap between neighbouring tines increases as material passes between tines and the risk of material becoming jammed between tines reduces.

Figure 19B:
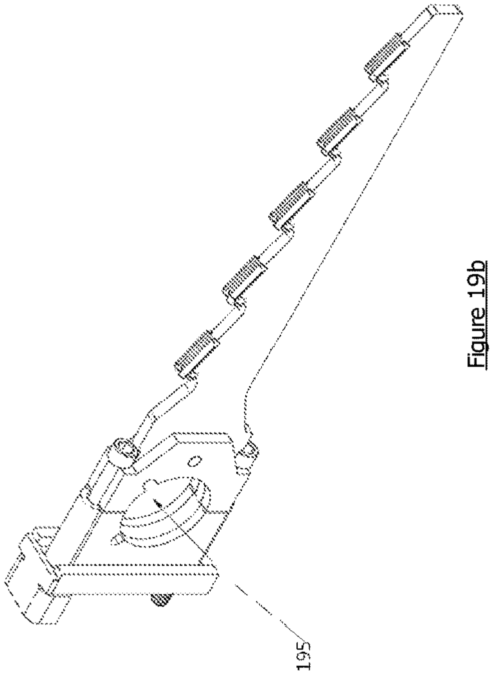
FIGS. 19*a*, 19*b* are perspective views of the tine of FIGS. 18, including a further embodiment of an attachment means.
Figure 19A:
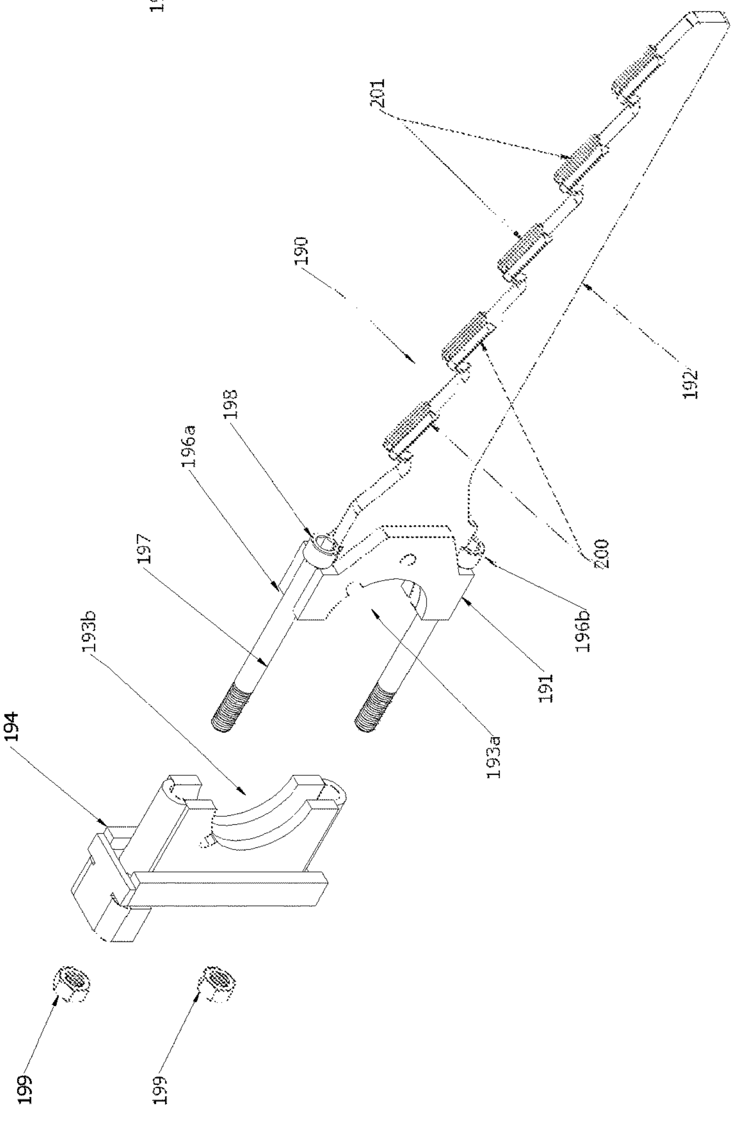

FIGS. 19*a*, 19*b* illustrate an embodiment of an attachment means suitable for use in the present invention. The attachment means is enables rapid attachment and removal of a tine to a tine array. The tine 190 has an attachment plate 191 secured to the tine body 192 by the means described above. The attachment plate 191 has a semi-circular cut-out 193*a* which co-operates with a corresponding aperture 193*b* on the second attachment plate 194 to form a circular aperture 195 through which a support bar passes. Channels 196*a*, 196*b* in the attachment plate 191 house threaded connectors 197. Each connector 197 has a head 198 utilisable when tightening the connection between the plates 191, 194. To secure the plates 191, 194 together, the connectors 197 pass through the plate 194 and are brought into threaded engagement with the nuts 199.

The tine body 192 has a saw-tooth arrangement of teeth 200, with the upper end of a tooth being surmounted by a cap 201.

Figure 20B:
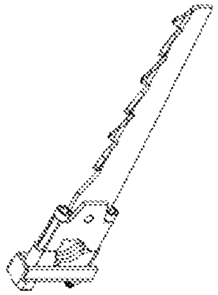
FIGS. 20*a*, 20*b* are perspective views of a tine having the attachment means of FIG. 19 and a further embodiment of teeth.
Figure 20A:
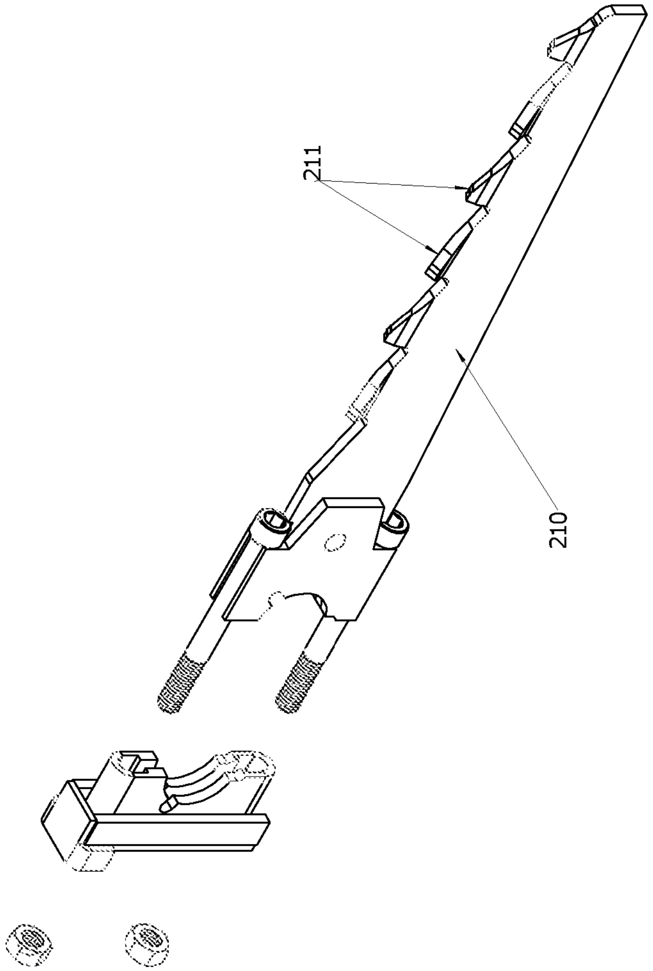
Figure 21B:
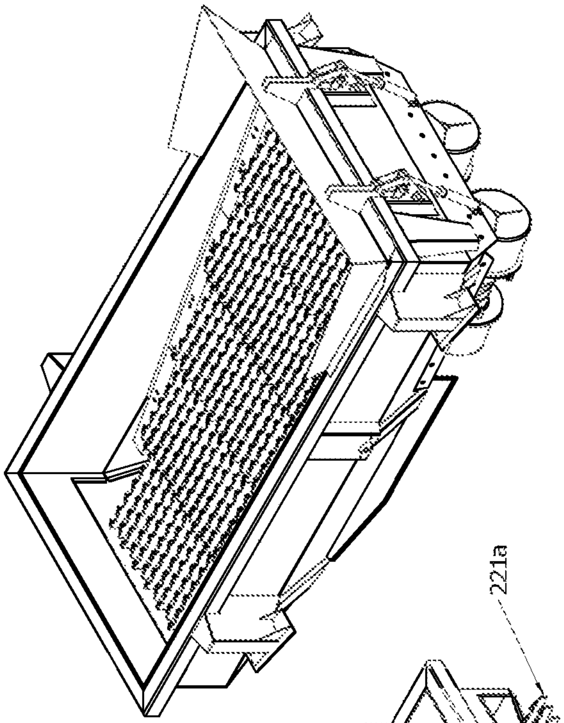
FIGS. 21*a*-d are perspective views and end views of an embodiment of an apparatus incorporating two arrays of tines, one beneath the other.
Figure 21A:
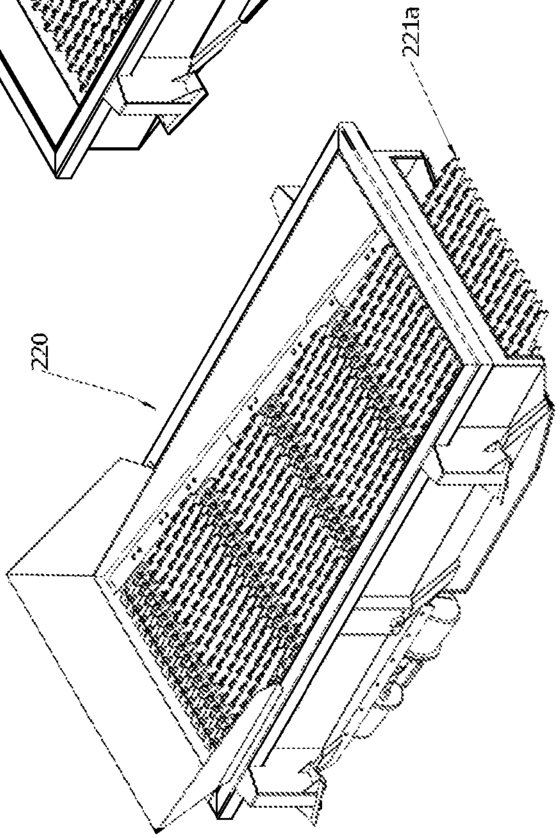
Figure 21D:
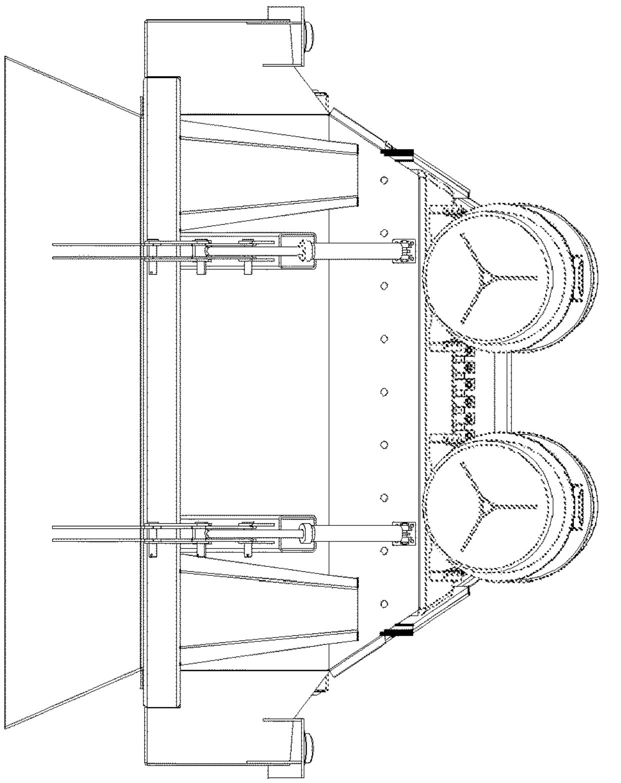
Figure 21C:
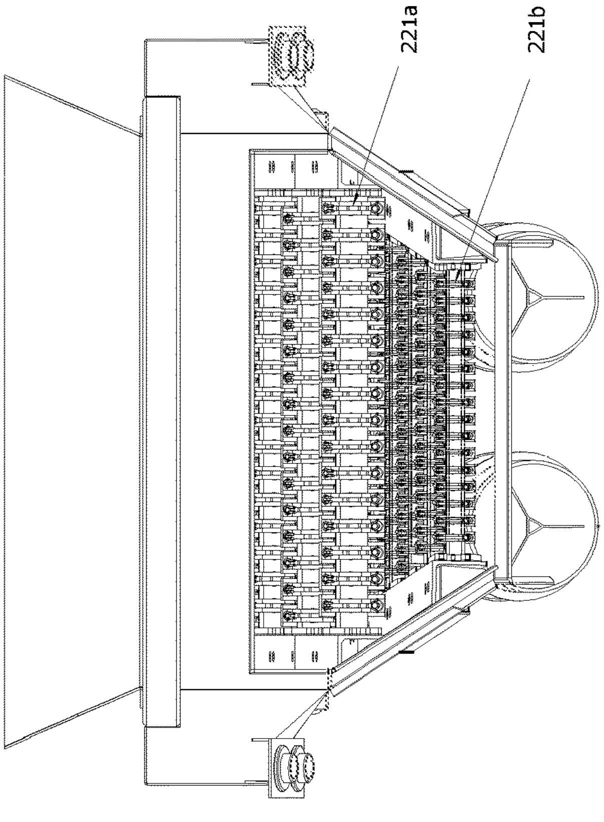

FIGS. 20*a*, 20*b* illustrate a tine in which the attachment plates are as described for FIGS. 19. The tine body 210 has teeth 211 deployed at different angles relative to each other. When viewed along the main axis of the tine body 210, the teeth 211 are offset from a direction parallel to the tine body to increase the cutting effect where required. Moreover, the offset of a tooth is in the opposite direction to adjacent teeth on a tine.

FIGS. 21 illustrate a second embodiment of separating apparatus 220 having 2 sets 221*a*, 221*b* of arrays of tines. The set 221*a* is deployed above the set 221*b* and receives material which passes through the arrays of the set 221*a*. Typically, the distance between neighbouring tines in the set 221*b* will be smaller than between tines in the set 221*a* to provide a material of lower average particle size than received from the set 221*a*. A further aspect of the invention, utilisable in the embodiments described herein is the inclusion of motors 222, mounted to the outside of the apparatus 220 to cause the apparatus to vibrate and so aid the passage of material through the tine arrays. The hopper 223 guides material onto the tines. The hopper 223 is open at one end to allow material too large to pass through the tines to exit the apparatus 220.

Figure 22:
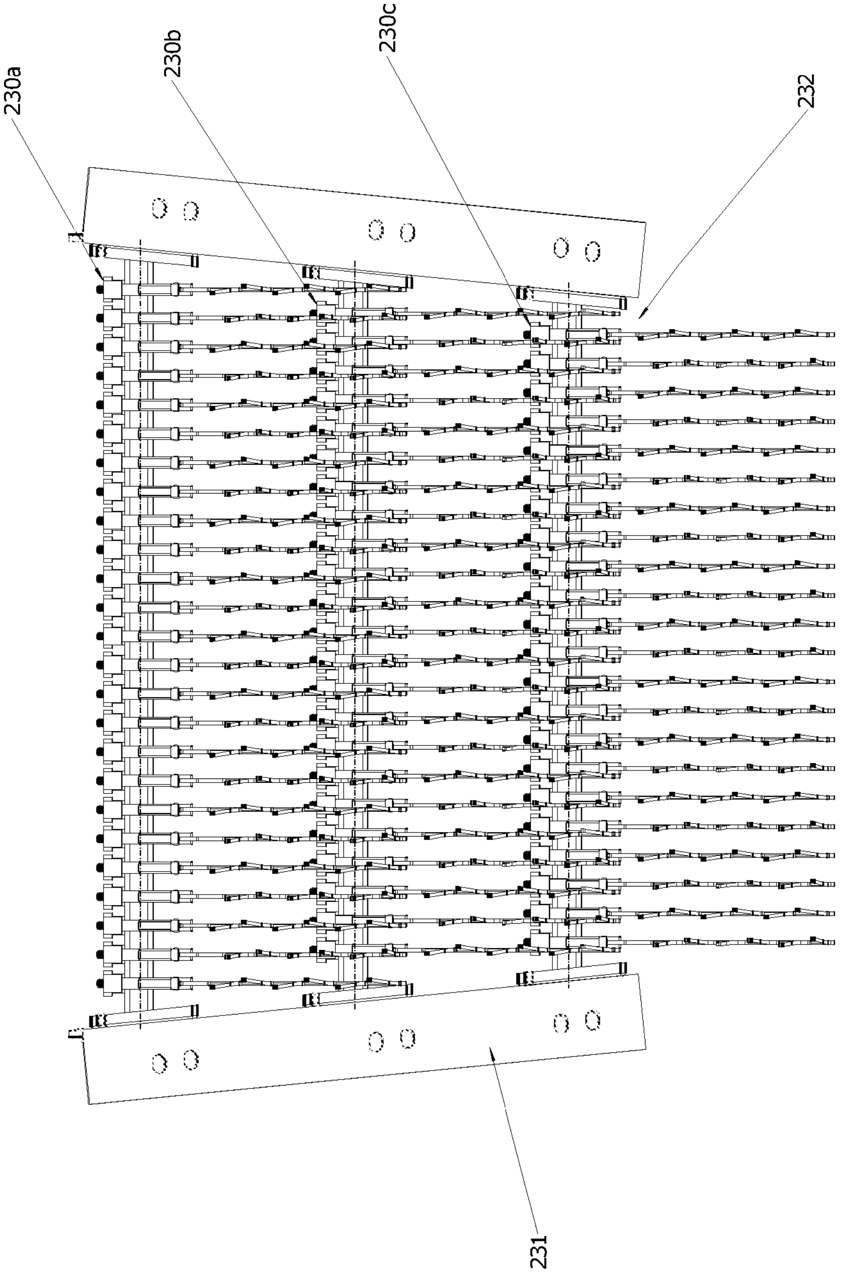
FIG. 22 is a top view of a hopper having a decreasing width in the direction of the discharge region of the hopper.

In the embodiment of FIG. 22, the set of arrays of tines is shown as having 3 arrays of tines 230*a-c*. The tines in this embodiment are in accordance with the embodiment shown in FIGS. 20, although tines having other configurations can be used. The array 230*a* is higher than the array 230*c*, the latter array 230*c* being adjacent the opening 232 in the hopper 231. The width of the hopper 231 decreases towards the opening 232. The number of tines in the array 230*a* is therefore greater than in the array 230*c*.

The invention claimed is:

1. A comminution apparatus comprising:
- a hopper to collect and guide material to be comminuted onto an array of tines, the array of tines having an elongate tine body having a first end and a second end and upper and lower surfaces,
- a tine among the array of tines being secured to a tine support at a first end, and
- a motor secured to the apparatus, operation of the motor causing the array of tines to vibrate,
- wherein a tooth deployed on an upper surface of the tine is offset to teeth on a neighbouring tine among the array of tines.

2. The comminution apparatus according to claim 1, wherein the apparatus further comprises:
- a set of two or more of the array of tines, deployed such that the second end of tines in an array of tines are adjacent the first ends of a neighbouring array of tines.

3. The comminution apparatus according to claim 2, wherein the second end of an array among the array of tines is deployed higher than the first end of an adjacent array of tines so that material can pass under gravity from one array of tines to a neighbouring array of tines.

4. The comminution apparatus according to claim 1, wherein the tine among the array of tines has a plurality of teeth including the tooth deployed on the upper surface of the tine.

5. The comminution apparatus according to claim 4, wherein the plurality of teeth are parallel to the elongate tine body.

6. The comminution apparatus according to claim 1, wherein the upper surface of the tine is wider than the lower surface.

7. The comminution apparatus according to claim 1, wherein tines in an array are deployed parallel to neighbouring tines in the array.

8. The comminution apparatus according to claim 1, wherein the tine includes one or more caps along the upper surface which act to widen the tine.

9. The comminution apparatus according to claim 1, wherein the apparatus further comprises an upper and lower set of the array of tines, the lower set being deployed beneath the upper set and receiving material falling between the tines of the upper set of the array of tines.

10. The comminution apparatus according to claim 9, wherein a distance between adjacent tines in the lower set of the array of tines is less than a distance between the upper set of the array of tines.

11. The comminution apparatus according to claim 1, wherein the tine is arranged so that the tine is in an inclined position relative to a horizontal plane.

12. The comminution apparatus according to claim 1, wherein multiple of the tines are arranged on the tine support, wherein two or more tine devices each comprises a different configuration of teeth.

13. The comminution apparatus according to claim 1, wherein an end of tine profile rises.

14. The comminution apparatus according to claim 1, wherein multiple of the tines are arranged on the tine support, wherein a space between two or more tines in the array of tines is variable.

15. A comminution apparatus comprising
- a hopper to collect and guide material to be comminuted onto an array of tines, the tines having an elongate body having a first end and a second end and upper and lower surfaces,
- each tine of the array of tines being secured to a tine support at a first end, and
- a motor secured to the apparatus, preferably the hopper, the operation of the motor causing the tines to vibrate,
- wherein each tine of the array of tines comprises a receiving body portion including an attachment to the elongate body to the tine support; wherein a tooth deployed on the upper surface of the tine is offset to teeth on a neighboring tine among the array of tines.

16. The comminution apparatus according to claim 15, wherein the attachment comprises a first surface with a first recess which cooperates with a first protuberance located on a surface of tine support.

17. The comminution apparatus according to claim 16, wherein the attachment further comprises a second surface with a second recess which cooperates with a second protuberance located on the surface of the tine support.

18. The comminution apparatus according to claim 15, wherein the attachment further comprises a first plate which abuts a first side of the elongate body, and a second plate that abuts a second side of the elongate body;
- the first plate comprises a first aperture, the second plate comprises a second aperture, the elongate body comprises a third aperture; whereby a pin being located within the cooperating first, second and third apertures, which in use attaches the elongate body to the attachment.

19. The comminution apparatus according to claim 18, wherein the attachment further comprises a third plate which abuts a second side of the elongate body, whereby the third plate abuts the first plate, wherein the first surface cooperates with the second surface to provide a first aperture which cooperates with the tine support.

20. The comminution apparatus according to claim 19, wherein the attachment further comprises a fourth plate which abuts a second side of the elongate body, whereby the fourth plate abuts the second plate, wherein a third surface cooperates with a fourth surface to provide a second aperture which cooperates with the tine support.

21. The comminution apparatus according to claim 20, wherein a tine further comprises a rear support bracket and an attached first elongate bar, whereby the first bar is located on a top surface of the elongate body, between the first, second, third and fourth plates.

22. The comminution apparatus according to claim 21, wherein the rear bracket comprises a second elongate bar, whereby the second bar is located on a bottom surface of the elongate body, between the first, second, third and fourth plates.

23. The comminution apparatus according to claim 21, wherein the first bar is welded to the tine support, and to the first and third plates and the second bar member is welded to the supporting member, first and third plate members.

24. A comminution apparatus comprising:

a hopper to collect and guide material to be comminuted onto an array of tines, the tines having an elongate body having a first end and a second end and upper and lower surfaces, a tine being secured to a tine support at a first end, a motor secured to the apparatus, preferably the hopper, the operation of the motor causing the tines to vibrate, wherein a tine is secured at the second end to a tine support to increase the the stability; wherein a tooth deployed on an upper surface of the tine is offset to teeth on a neighbouring tine among the array of tines.

* * * * *